July 11, 1961   L. ELIGOULACHVILI   2,991,906
STRUCTURE FOR TRANSPORTING CARGOES
Filed May 27, 1957   4 Sheets-Sheet 1
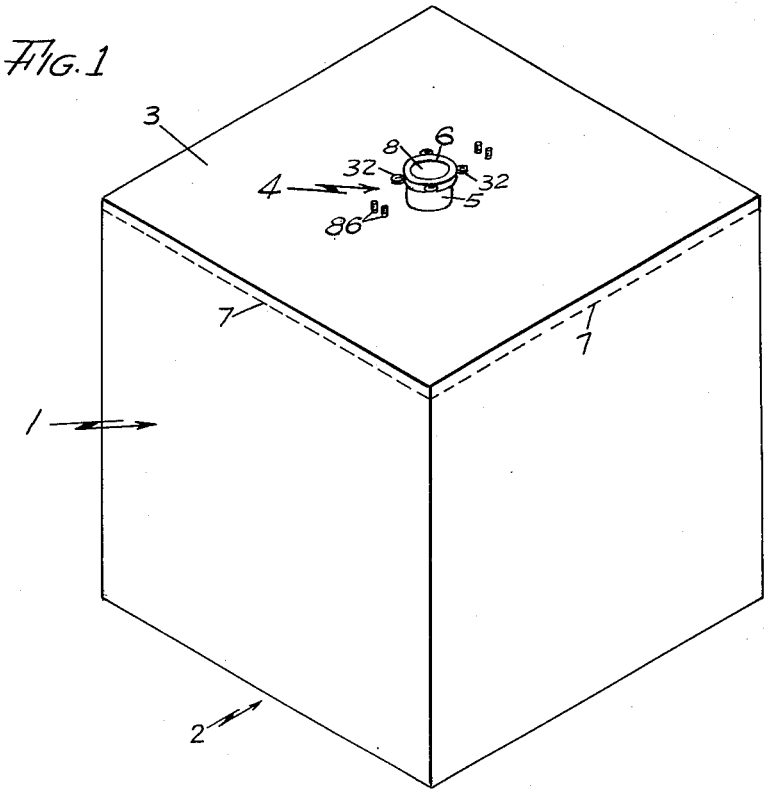
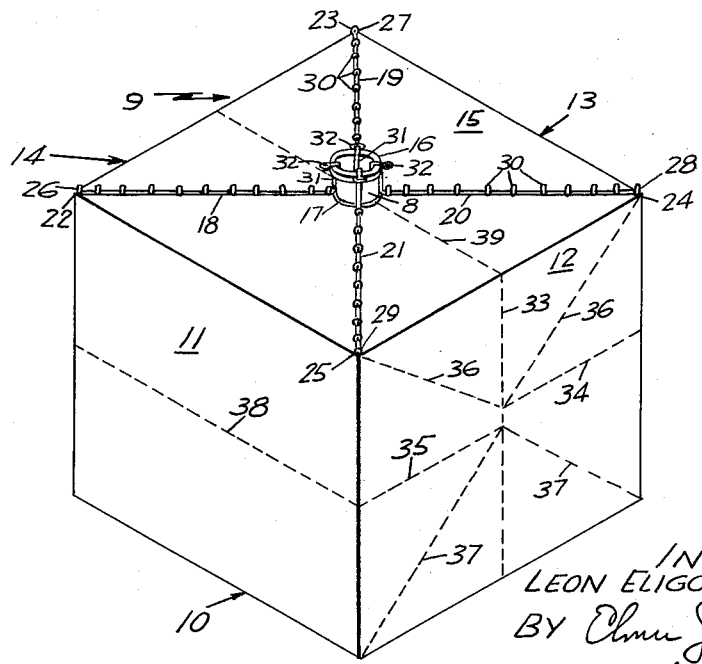
INVENTOR
LEON ELIGOULACHVILI
BY
ATTORNEY July 11, 1961    L. ELIGOULACHVILI    2,991,906
STRUCTURE FOR TRANSPORTING CARGOES
Filed May 27, 1957    4 Sheets-Sheet 2

INVENTOR
LEON ELIGOULACHVILI
BY
ATTORNEY

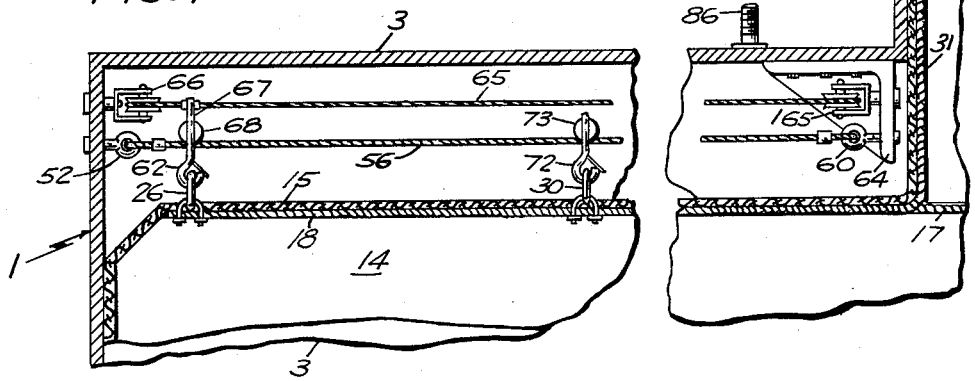
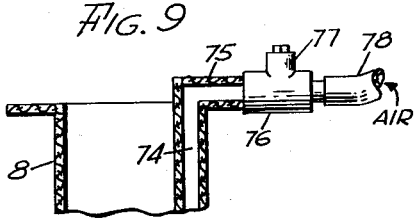
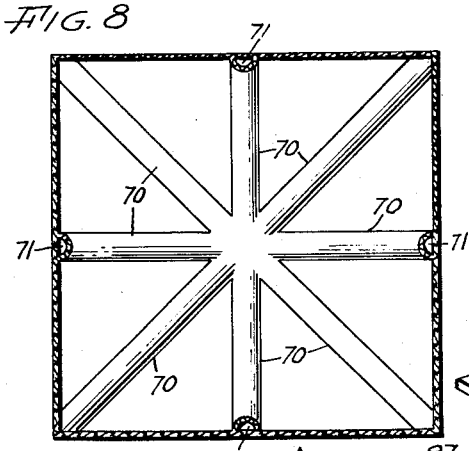
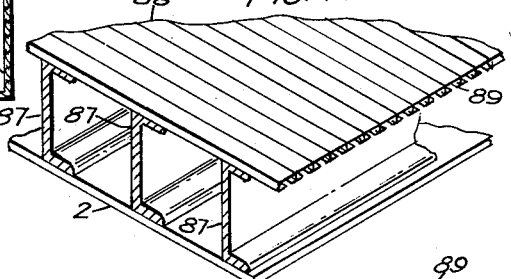
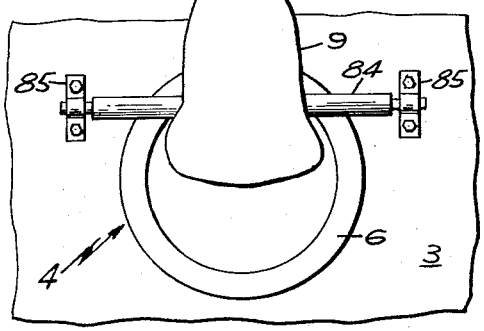
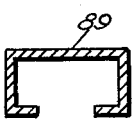

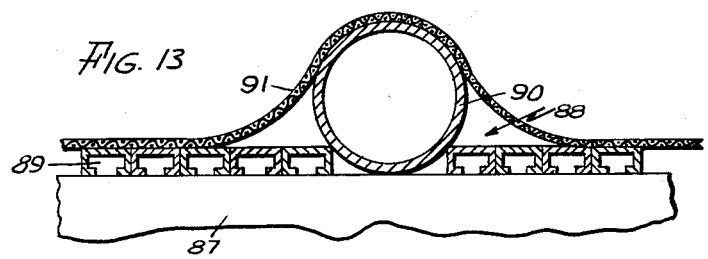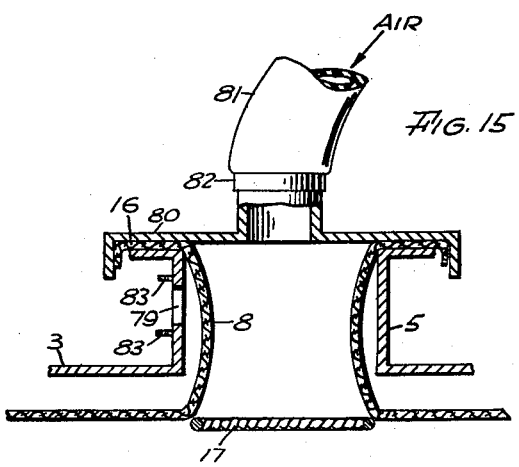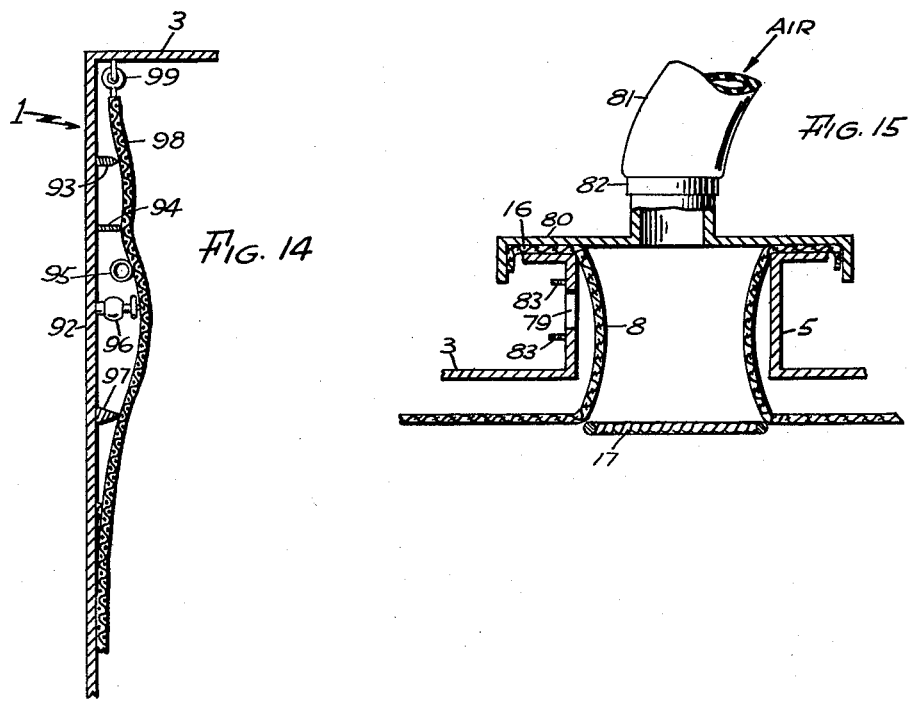

United States Patent Office 2,991,906
Patented July 11, 1961

2,991,906
STRUCTURE FOR TRANSPORTING CARGOES
Leon Eligoulachvili, 31 Lilienblum St., Tel Aviv, Israel
Filed May 27, 1957, Ser. No. 661,958
2 Claims. (Cl. 220—63)

This invention relates to a structure and system transporting a variety of different cargoes in a hold normally adapted to carry a liquid cargo, such as petroleum.

Heretofore, a vessel, such as a tanker, which is designed to carry a petroleum cargo has been able to transport its cargo in only one direction. This has been due to the fact that the residue of petroleum left in the hold of such a vessel upon unloading is incompatible with other cargoes and it is impracticable to attempt to clean such a hold sufficiently to enable such another cargo to be carried without contamination. Therefore, such a tanker must travel without transporting a useful cargo back to a port where it can again pick up a paying cargo. If such a tanker could be designed to carry a freight-paying cargo on each leg of its journey, the financial return from the operation of such a tanker would be greatly increased.

In accordance with the present invention, a structure has been devised whereby, by the use of a readily removable fabric liner or envelope fitted within a hold or tank, the desired object of transporting mutually incompatible cargoes on successive legs of the journey of a tanker readily can be attained in a rapid and economical manner.

The foregoing and other objects and advantages of the present invention will be more readily understood from the following description of exemplifications thereof, reference being had to the accompanying drawings wherein:

FIG. 1 is a substantially diagrammatic isometric view of a tank which indicates the relation of the novel liner thereto;

FIG. 2 is an isometric view of one form of liner;

FIG. 7 is a partial section taken substantially along line 7—7 of FIG. 5 and illustrating the mechanism for spreading and supporting the liner across the top of the tank;

FIG. 8 is a cross section taken across a liner near its bottom and looking downward at said bottom to illustrate certain air passages in the sides and bottom of the liner;

FIG. 9 is a partial section taken across the upper portion of the neck of the liner to illustrate the manner in which air may be introduced into the air passages shown in FIG. 8;

FIG. 10 is a view looking down at the opening to the tank as the liner is being removed;

FIG. 11 is a view of a portion of the floor of one form of tank showing the construction of removable flooring to provide a smooth and continuous support for the bottom of the liner;

FIG. 12 is a sectional view taken across one of the elements of the removable flooring of FIG. 11;

FIG. 13 is a sectional view across a portion of one form of tank to illustrate the manner of providing a suitable support for the liner around protruding portions within the tank;

FIG. 14 is a partial sectional view showing a protective curtain to shield the liner against damage by projecting wall parts; and FIG. 15 is a partial sectional view through the tank hatch showing a method of inflating the tank liner with air.

Figure 3:
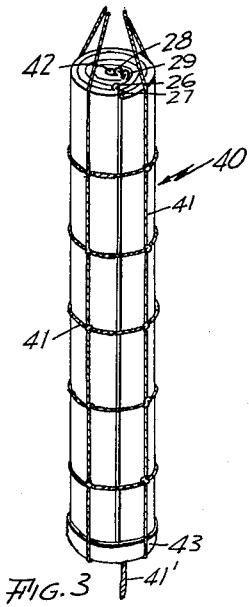
FIG. 3 is a showing of the liner folded and rolled for insertion into a tank.

The tank 1 illustrated in FIG. 1 may be one of the tanks in an ocean-going oil tanker. It is cubical in form with a floor 2, four walls and a roof 3. A typical tank may be approximately thirty-six feet square and about thirty-eight feet high. An entrance hatch 4 consisting of a circular opening in the roof is surrounded by a combing 5, the upper end of which is provided with a flange 6 to which the hatch cover may be secured. A typical hatch may have its opening approximately four feet in diameter with its combing about two and one-half feet high. In accordance with this invention, a suitable liner is inserted into the tank through the hatch 4 to cover the floor 2 and the walls of the tank 1 to about one foot below thereof 3 as indicated by the dotted line 7. The top of the liner is suitably supported at this level, as will be described below. A neck portion 8 extends from the top of the liner to form a lining for the combing 5 and is drawn out over the flange 6.

The liner intended to be used in FIG. 1 is shown in FIG. 2. This liner, designated by the numeral 9, is made of a flexible sheet material or fabric which is impervious and inert with respect to the cargoes which are to be carried in the tank 1. A suitable material for this purpose is nylon cloth impregnated and coated with neoprene. Available widths of this material may be joined together by stitching or cementing into the proper size and shape. The seams, of course, must be coated to make them impervious to the cargoes carried and the coatings and cements used must also be inert with respect to such cargoes.

The liner 9 has a bottom 10, four sides 11, 12, 13 and 14 and a top 15. The neck 8 is attached to a round opening in the top 15 and terminates in an annulus 16 adapted to overlie the flange 6 of the combing 5. A ring of nylon rope 17 is secured around the bottom of the neck 8 to provide reinforcing. From the ring 17 reinforcing nylon ropes 18, 19, 20 and 21 extend to the four corners 22, 23, 24 and 25 of the top 15 and are secured to the top throughout the length of each of them. Steel rings 26, 27, 28 and 29 are secured to the exterior of the top 15 at each of its four corners. Similar steel rings 30 are also attached to the exterior of the top 15 along each of the reinforcing ropes 18, 19, 20 and 21. These rings 30 are spaced about three feet apart up to a short distance from the ring 17. Four short nylon ropes 31 extend from the ring 17 along the neck 8 and the annulus 16 to steel rings 32. All of the ropes 17, 18, 19, 20, 21 and 31 are cemented into the liner walls to supply the reinforcing necessary to support the weight of the liner.

Each of the walls 12 and 14 is provided with the fold lines as indicated by the dotted lines on the side 12. A vertical fold line 33 extends centrally and vertically along the respective side. Two horizontal fold lines 34 and 35 extend from the line 33 a short distance above and below the center of that line in order to take care of the thickness of the fabric of the liner when it is folded. Diagonal fold lines 36 extend from the inner end of fold line 34 to the upper corners of the respective side, and diagonal fold lines 37 extend from the inner end of line 35 to the lower corners of the respective side. A horizontal fold line 38 extends along side 11 from the outer end of line 35 and a similar fold line (not shown) extends along side 13 from the outer end of line 34. The central fold line 33 is extended as line 39 along the center of the top wall 15 and as a similar line (not shown) along the bottom wall 10. In practice all fold lines would be printed permanently on the outer walls of the liner.

Figure 4:
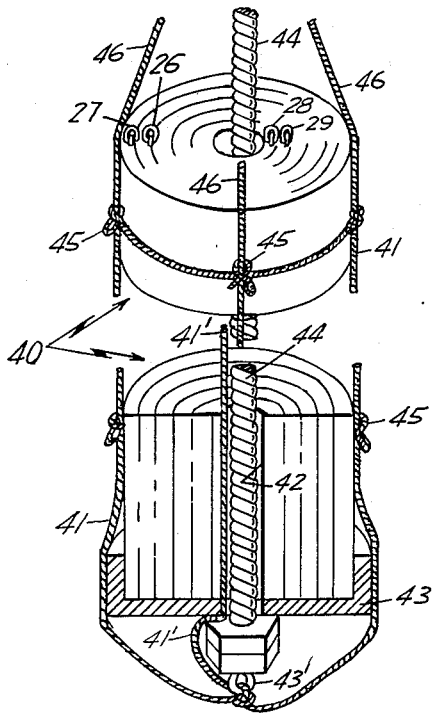
FIG. 4 is a view partly in section and partly broken away showing the arrangement of FIG. 3 on a larger scale.

In preparing the liner for insertion into the tank, the liner is first folded inwardly along lines 33 through 38 into a flat square. The square is then folded along the line 39 on the top 15 by lifting the upper edges of the sides 13 and 11 upwardly. A rope (to be described below) is attached to the rings 32 for a final hoisting operation. The resulting rectangular package is then rolled up into the roll 40, as illustrated in FIG. 3. As a result of the above method of folding and rolling, the four steel rings 26, 27, 28 and 29 can be made to project from the upper end of roll 40. Lashings 41 are used to tie the roll into a compact bundle with an opening 42 extending through the roll and the rope attached to said rings 32 extends from the bottom of the roll as indicated at 41'. A circular steel plate 43 may be mounted on the lower end of the roll 40. As shown in FIG. 4, a heavy steel cable 44 is attached to the center of the plate 43 and drawn through the opening 42 whereby the upper end of the cable 44 may be attached to a hoist so that the roll 40 may be lifted into position. The lashing 41 is provided with suitable knots 45 so that the lashing may be cast off at successive positions along the roll 40 by pulling on the upper lengths 46 of the lashing 41. The lower side of the plate 43 may be provided with a ring 43' to which the lower ends of the lashing 41 may be attached, whereby the lashing is lifted out of the tank when the cable and plate are hoisted, as will be described below. Likewise, the rope 41' passes through a hole or space in the plate 43 and is also attached to the ring 43'.

Figure 6:
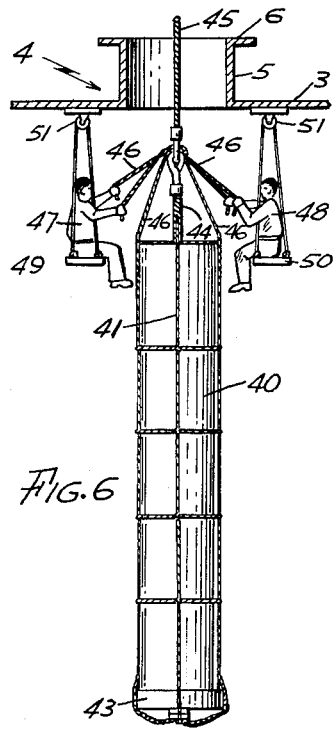
FIG. 6 is a partial sectional view taken along line 6—6 of FIG. 5 and showing one step in the method of inserting the liner into the tank.

As illustrated in FIG. 6, in order to introduce the linear into the tank, the upper end of the cable 44 is hooked onto a rope 45 operated by a hoist on the tanker and the roll is lowered through the hatch 4. The folding and rolling produces a package which is of a size which readily fits through the usual size of opening in the hatch.

Two men 47 and 48 can be lowered into the tank with boatswain's chairs 49 and 50 which can be hung from rings 51 secured to the top of the tank for this purpose. These men will hang the liner from the top of the tank in a manner to be described.

Figure 5:
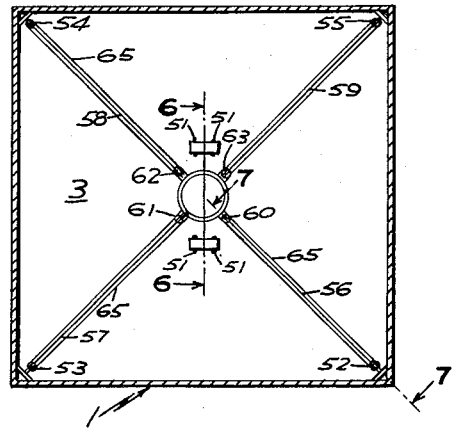
FIG. 5 is a section taken across the top of a tank and looking upward toward the roof thereof which has been adapted to support the liner.

As shown in FIGS. 5 and 7, adjacent the corners of the tank 1 just below the top wall 3 are mounted four rings 52, 53, 54 and 55. Steel cables 56, 57, 58 and 59 are drawn taut between these rings and four rings 60, 61, 62 and 63 mounted at the edge of the hatch opening on a series of brackets 64. Above each cable 56—59 is mounted a pull rope 65 extending in an endless loop around a pair of pulleys 165 and 66 fixed, respectively, to one of the brackets 64 and to one corner of the tank just above one of the rings 52—55. Rigidly fixed to each pull rope at one point thereon is a carriage 67 carried by a trolley roller 68 which rides on its associated cable, as, for example, cable 56 in FIG. 7. The carriage 67 has a hook 69 mounted below it so that the ring 26 may be snapped into hook 69. Likewise, the rings 27, 28 and 29 may be snapped into hooks 69 associated with the respective cables 57, 58 and 59.

After the men 47 and 48 are in place in the boatswains' chairs 49 and 50, the roll 40 is hoisted to a level at which the rings 26, 27, 28 and 29 are readily accessible to the men. One of them will hook two of these rings, e.g., rings 26 and 27, onto the hooks 69 associated with the two cables 56 and 57 and the other man will hook the other two rings 28 and 29 onto the hooks 69 associated with the cables 58 and 59. Once these rings have been snapped onto the hooks 69, the men 47 and 48 may start casting off the lashing 41 by pulling on the ends 46. The pull ropes 65 are actuated to move the rings 26—29 toward the corners of the tank which causes the roll 46 to start to unfold and brings rings 30 successively into position to be grasped by the men 47 and 48. This action is assisted by actuating the hoist to raise the plate 43 to raise the roll 40 as needed. The rings 30 are successively snapped onto hooks 22 carried by trolley rollers 73 mounted to ride on the cables 56—59. These trolley rollers may be permanently mounted on their cables or the men may carry a supply of such trolley rollers which can be placed on the cables as they are needed. As necessary, additional parts of the lashing 41 are cast off until the lower end of the roll 40 is released from the plate 43. A slight lowering of the plate 43 at the proper time may assist this action. As a result, as the pull ropes 65 are continued to be actuated to draw the rings 26—29 into their respective corners of the tank, the rolled and folder liner unfolds and its lower portion drops down toward the bottom of the tank. As soon as practicable, the cable 44 and plate 43 are hoisted out of the tank. The rings 30 stop sufficiently short of the neck 8 so that, when the rings 26—29 have reached their respective corners, the central part of the top of the liner will sag down sufficiently far to provide space for the two men. At this point, the men 47 and 48 may be lifted out of the tank with their boatswains' chairs. Thereupon the rope 41' attached to the rings 32 is used to draw the neck portion 8 of the liner up through the hatch, whereupon the annular portion 16 may be drawn over the flange 6 and secured in place in any suitable manner. At this point, the entire top portion of the liner 9 has been spread into its proper position within the tank 1.

The lower portion of the liner 9 which has dropped will not, of its own action, extend smoothly into the lower corners of the tank. Several alternative methods may be employed to accomplish this action.

Men, wearing soft shoes, could be lowered into the tank and arrange the corners and edges of the lower portion of the liner into their desired positions. Alternatively, the arrangement illustrated in FIGS. 8 and 9 may be used. The lower wall of the liner could be fabricated with a plurality of air passages 70, preferably arranged in the form of a St. Andrews cross. The air passages 70 communicate with each other and with vertical air passages extending vertically along the sides of the liner. At least one of the passages 70 continues across the top of the liner and connects with an air passage 74 extending through the neck 8. The air passage 74 terminates in a pipe 75 provided with a fitting 76, to the outer end of which is connected an air line 78 to inflate the passages 70 and 71. Upon being inflated in this way, the corners and edges of the lower wall of the liner will be forced into their proper positions and the vertical passages 71 will provide a stiffening action for the side walls to hold them in position to facilitate the proper loading of the cargo into the liner. As the cargo is loaded, its pressure will force the air out of the passages 70 and 71. A suitable air relief valve 77 is provided in the fitting and arranged to open to discharge the air from the passages 70 and 71 as their air is subjected to the pressure of the cargo.

Another alternative arrangement is shown in FIG. 15 in which the wall of the combing 5 is provided with a side opening 79 and a cover 80 is placed over the top of the combing on top of the annular portion 16. A large pipe 81 is attached to a pipe 82 formed at the center of the cover 80 to blow a large quantity of low pressure air into the liner 9. As the liner 9 becomes inflated, it is forced outwardly and spreads smoothly into all the corners, the air on the outside of the liner 9 being forced out through the side opening 79. Subsequently the opening 79 may be closed by a suitable cover held in place by stud bolts 83. When the cover 80 is removed, the liner 9 will remain in its proper position.

Once the liner 9 has been properly disposed within the tank 1, virtually any kind of bulk cargo can be loaded into the tank with no danger of any contamination from any other cargo which has previously been transported in the tank. The only load which is exerted on the structure of the liner is the compression load on the liner material whereby no danger of tearing the liner is created.

After the liner has been used in the transportation of a cargo, the soiled liner may be removed to permit the loading of the tank with a cargo of the same nature as that used before the liner was inserted. The removal of the liner is essentially the reverse of the loading procedure. The annular portion 16 is released from the flange 6 and the line or rope 41' is reattached to the rings 32. The line 41' is lowered into the tank to permit the neck 8 and the center of the upper wall 15 of the liner 9 to sag down and provide sufficient space for the two men and the two boatswains' chairs to be lowered into the tank in the position as described in connection with FIG. 6. The men will now actuate the pull ropes 65 to draw the hooks 69 out of the corners and back toward the center of the tank. As this is being done, the rings 30 are successively unsnapped from the hooks 72 and finally the rings 26—29 are unhooked from the hooks 69. At this point the liner will be hanging from the line 42' by the rings 32. The men and the boatswains' chairs can then be hoisted out of the tank. The liner can now be dragged from the tank by hoisting on the line 42'. However, it may also be desirable to provide a roller 84 supported across the top of the hatch 4 and to one side of its opening (see FIG. 10). This roller can be mounted in supports 85 which can be bolted into place by stud bolts 86 secured to the top of the tank (see FIGS. 1 and 7). As the liner 9 is dragged from the tank through the hatch 4, the roller 84 forms a convenient abutment to facilitate the removal of the liner without danger of tearing the liner.

After the liner 9 has been removed, it is preferable that it be cleaned in any suitable manner and then dried. It can then be folded and rolled as described above and stored until it is needed again.

In applying this invention to existing tankers, it is unlikely that a tank will be encountered which is free from projections and structures which may exert cutting or tearing strains on the fabric of the liner. As illustrated, for example, in FIG. 11, the bottom wall 2 of the tank may be provided with ribs 87 running across the ship. In one such case, these ribs were about four feet high and about six feet apart. Various other types of projections, such as pipes, valves, studs and the like, may also be present. If these are generally below the level of the tops of the ribs 87, the situation can be taken care of by laying a loose temporary floor 88 across the tops of the ribs. This floor preferably consists of removable aluminum beams 89, one of which is shown in enlarged cross-section in FIG. 12. These beams 89 can be laid cross-wise across the tops of the ribs 87, thus producing a relatively smooth floor to support the lower wall of the liner 9 and likewise to support the cargo loaded therein.

In some cases there may be projections which extend above the level at which it is practicable to build the temporary floor 88. A situation of this kind is shown in FIG. 13 where a large pipe 90 is shown located on the tops of the ribs 87. In order to provide a surface to afford proper support for the material of the liner, a fairing 91 is laid loosely across the pipe 90 to produce a gradual transition curve from the floor 88 over the pipe 90. The fairing 91 is preferably made of a tight mesh wire cloth. A suitable cloth for this purpose is 16 by 200 stainless steel filter cloth. Such a material is inert with respect to all kinds of bulk cargoes, such as petroleum. It also possesses sufficient strength to prevent undue localized loading of the liner and it also prevents cutting of the liner by sharp protrusions on the tank surfaces. Therefore, if, as shown in FIG. 14, a side wall 92 of the tank 1 has any such protrusions as illustrated by the reference numbers 93—97 which cannot readily be removed, then a material as described in connection with the fairing 91 is hung as a curtain 98 from suitable hangers 99 fastened to the top 3 adjacent the side wall. This curtain can be allowed to hang of its own weight and it will provide the proper backing for the material of the liner. In many cases, it may be necessary to hang such a curtain to cover all side walls of a tank which is to be fitted with the liner of this invention.

Of course, it is to be understood that this invention is not limited to the particular details as described above as many equivalents will suggest themselves to those skilled in the art. For example, certain aspects of this invention may be applied to other vehicles than tankers, as, for example, tank cars. Also, it may be desirable to adapt storage devices to multiple storage purposes by utilizing the teachings set forth herein. It is believed that other variations will suggest themselves to those skilled in the art. It is accordingly desired that the appended claims be given a broad interpretation commensurate with the scope of the invention within the art.

What is claimed is:

1. A structure for transporting incompatible bulk cargoes comprising; a rigid liquid-tight container, a flexible envelope removably supported within said container and bearing directly upon the bottom and side interior surfaces of said container, said envelope being made of a material which is impervious and inert with respect to said cargoes, said container being provided with a roof portion having an entrance hatch, a plurality of supporting cables stretched between said hatch and the upper side walls of said container, the upper wall of said envelope being provided with a row of supporting members suspended from each of said cables, a pull rope in the form of an endless loop mounted on a pair of pulleys supported by said container adjacent the ends of each of said cables, and an end supporting member in each of said rows being attached to one of said pull ropes.

2. A structure for transporting incompatible bulk cargoes comprising; a rigid liquid-tight container, a flexible envelope removably supported within said container and bearing directly upon the bottom and side interior surfaces of said container, said envelope being made of a material which is impervious and inert with respect to said cargoes, a tight mesh wire cloth located over projections on any interior walls of said container and interposed between said envelope and said projections to afford a strain-relieving support for the material of said envelope.

References Cited in the file of this patent

UNITED STATES PATENTS

| | | |
|---|---|---|
| 593,674 | Mather | Nov. 16, 1897 |
| 1,452,039 | Gravell | Apr. 17, 1923 |
| 1,744,719 | Berry et al. | Jan. 28, 1930 |
| 1,950,316 | Lorenz | Mar. 6, 1934 |
| 2,097,985 | Maryott | Nov. 2, 1937 |
| 2,394,607 | Gray | Feb. 12, 1946 |
| 2,462,215 | Norman et al. | Feb. 22, 1949 |
| 2,594,235 | Taylor | Apr. 22, 1952 |
| 2,699,431 | Harvey et al. | Jan. 11, 1955 |
| 2,712,797 | Woehrle et al. | July 12, 1955 |

FOREIGN PATENTS

| | | |
|---|---|---|
| 184,870 | Switzerland | Sept. 1, 1936 |
| 297,558 | Italy | June 15, 1932 |
| 484,440 | Canada | July 1, 1952 |